United States Patent [19]

Waterson et al.

[11] Patent Number: 4,956,633

[45] Date of Patent: Sep. 11, 1990

[54] BREAK LIGHT ENHANCER WITH FAIL SAFE PROTECTION

[75] Inventors: Charles K. Waterson, Chapel Hill, N.C.; Richard Vercillo, Tucson, Ariz.

[73] Assignee: Dr. Fernald Wentzell, Oceanside, Calif.

[21] Appl. No.: 436,498

[22] Filed: Nov. 14, 1989

[51] Int. Cl.$^5$ ............................................. B60Q 1/52
[52] U.S. Cl. ..................................... 340/471; 340/479
[58] Field of Search ......................... 340/479, 467, 471

[56] References Cited

U.S. PATENT DOCUMENTS 3,914,739  10/1975  Caughlin et al. .................... 340/479
4,346,365   8/1982  Ingram ................................. 340/479
4,403,210   9/1983  Sullivan ............................... 340/479

Primary Examiner—Joseph A. Orsino
Assistant Examiner—Frank M. Scutch, III
Attorney, Agent, or Firm—Baker, Maxham, Jester & Meador

[57] ABSTRACT

A brake light enhancer circuit which may be readily connected to the brake light circuit of a conventional motor vehicle causes the brake lamps to be flashed a predetermined number of times when the brake pedal is initially depressed and thereafter causes the brake lights to be steadily illuminated so long as the brake pedal remains depressed. If, however, a turn signal indicator has been activated before or during the application of the brake pedal, the brake light enhancer circuit does not flash the rear brake lamps, but rather illuminates them continuously as long as the brake pedal is depressed. The circuit is configured so that normal brake light operation will not be impaired upon misconnection to the vehicle or failure or any component of the brake light enhancer circuit itself.

9 Claims, 3 Drawing Sheets

BREAK LIGHT ENHANCER WITH FAIL SAFE PROTECTION

BACKGROUND OF THE INVENTION

The present invention relates to motor vehicle signal lights systems, and more particularly, to a brake light enhancer circuit which may be inserted into a conventional motor vehicle lighting system to provide a more eye catching brake or deceleration signal to following drivers.

It has long been known that intermittently flashing or pulsing lights attract more attention than lights which are steadily or continuously illuminated. Thus, flashing turn signal lights are used on the rear of motor vehicles to insure that following drivers are warned of an impending turn. It is conventional, however, to provide left and right rear brake lamps which are continuously illuminated so long as the brake light switch remains closed by continuous pressure on the brake pedal.

In U.S. Pat. No. 4,403,210 of Sullivan, granted Sept. 6, 1983, there is disclosed a brake light enhancer circuit which may be inserted into a conventional motor vehicle lighting system to provide a more eye catching braking or deceleration signal to following drivers. The circuit of the Sullivan invention may be connected between the rear signal lamps, brake light switch and flasher in a conventional vehicle lighting system. It includes a timer or pulse generator, a counter and a disable latch. In motor vehicles having a pair of left and right rear turn signal lamps and a pair of left and right rear brake lamps, closure of the brake light switch when the turn signal switch is in its neutral position will cause the brake lamps to flash on and off a predetermined number of times, and thereafter remain continuously illuminated. The Sullivan brake light enhancer circuit is disabled when the turn signal switch is moved to either its left or right turn position. In this condition, the turn and brake light signals are conventional, thereby preventing confusion of following drivers.

While the brake light enhancer circuit of the '210 Sullivan patent is an improvement over conventional vehicle brake lighting systems, it has been found that still further improvement is required before Government agencies, such as the National Highway Transportation and Safety Board, will permit utilization of the same. More specifically, it would be desirable to provide such a brake light enhancer circuit with fail safe protection, so that should any component of the enhancer circuit fail, conventional operation of the brake lights will not be impaired.

SUMMARY AND OBJECTS OF THE INVENTION

It is therefore the primary object of the present invention to provide an enhancer circuit, which may be readily connected to a conventional brake light circuit of a vehicle for flashing the rear brake lamps a predetermined number of times when the brake pedal is initially pressed, and which has a fail safe feature so that in the event of any component failure, normal operation of the brake light circuit is not impaired.

The illustrated embodiment of our invention comprises a brake light enhancer circuit which may be readily connected to the brake light circuit of a conventional motor vehicle. It causes the brake lamps to be flashed a predetermined number of times when the brake pedal is initially depressed and thereafter causes the brake lights to be steadily illuminated so long as the brake pedal remains depressed. If, however, a turn signal indicator has been activated before or during the application of the brake pedal, the brake light enhancer circuit does not flash the rear brake lamps, but rather illuminates them continuously as long as the brake pedal is depressed. The circuit is configured so that normal brake light operation will not be impaired upon misconnection to the vehicle or failure of any component of the brake light enhancer circuit itself.

BRIEF DESCRIPTION OF THE DRAWING

The above and other objects and advantages of the present invention will become apparent from the following description when read in conjunction with the accompanying drawings wherein.

DETAILED DESCRIPTION OF THE PREFERRED EMBODIMENT

Our brake light enhancer circuit preferably comprises a module, which may be readily connected to the conventional brake light circuit of a motor vehicle. The module may consist of a conventional printed circuit board (not illustrated), which physically supports and electrically interconnects electronic components to form the circuit of FIG. 1. The module further preferably comprises certain electrical leads and jumper connectors (not illustrated), which permit the module to be readily connected to the terminals of a conventional brake light circuit of a vehicle. The module may further optionally comprise a removable protective housing which is connected to the printed circuit board and encloses the electronic components mounted thereon.

Our brake light enhancer circuit alters the operation of the conventional brake light circuit so that upon application of the brake pedal, the rear brake lamps will be flashed three times within two seconds, and thereafter will remain continuously illuminated as long as the brake pedal is depressed. If, however, a turn signal indicator has been activated before or during the application of the brake pedal, our brake light enhancer circuit does not flash the rear brake lamps, but rather illuminates them continuously as long as the brake pedal is depressed. Thus, our brake light enhancer circuit does not effect normal operation of the turn signal lamps.

In addition to the foregoing enhancement functions, the preferred embodiment of our brake light enhancer circuit contains circuitry for monitoring its own functions, and for providing fail safe operation in all foreseeable modes. More specifically, the brake light enhancer circuit of FIG. 1 is designed so as not to be damaged, or cause damage to the vehicle brake light circuit, if it is improperly connected. Additionally, our brake light enhancer circuit provides for safe vehicle brake light operation in the event of failure of any of its electronic components as described below.

Figure 1A:
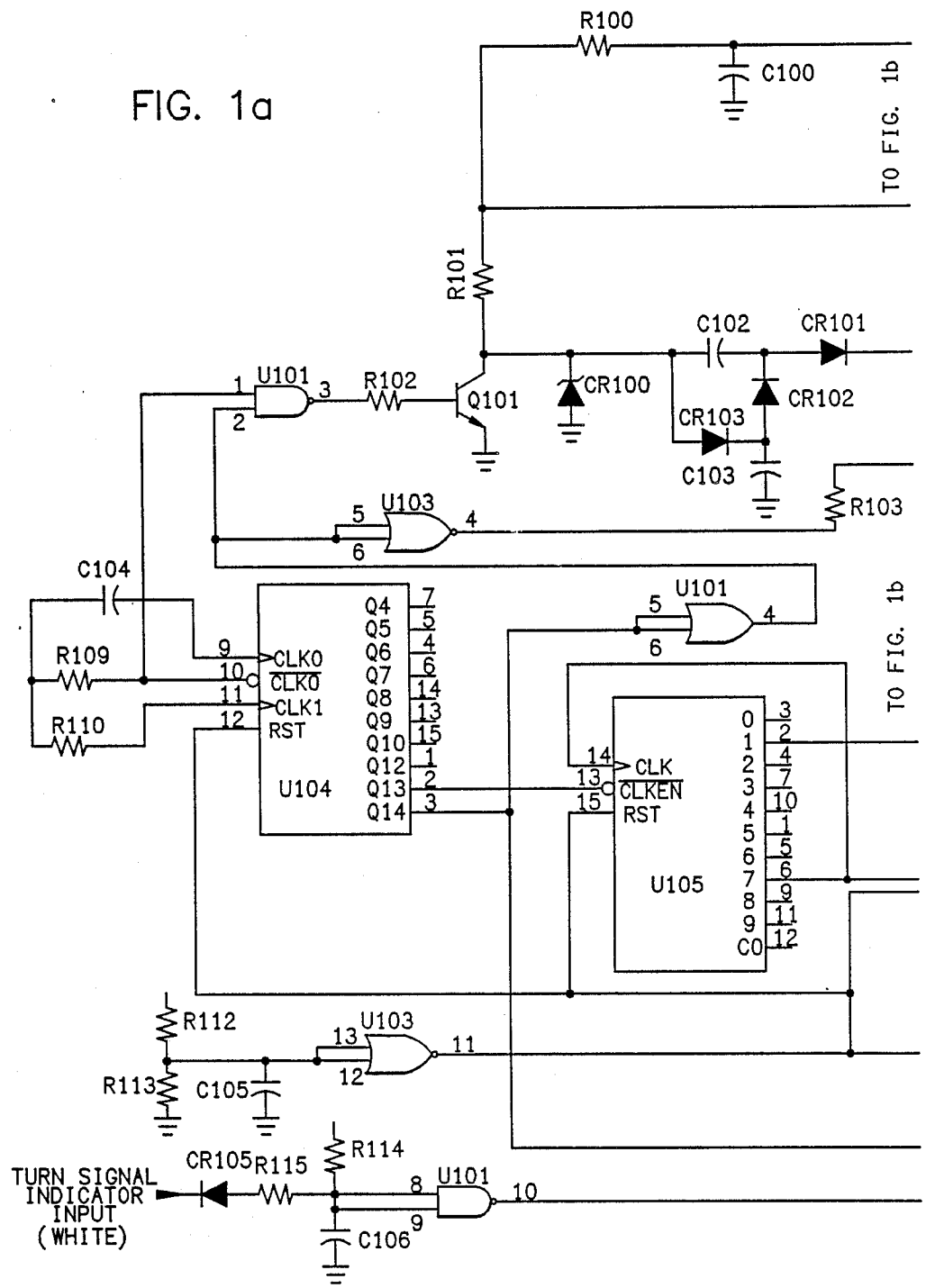
FIGS. 1a and 1b taken together, are a schematic diagram of a preferred embodiment of our brake light enhancer circuit with fail safe protection. The ten lines at the right side of FIG. 1a connect to the correspondingly positioned ten lines on the left side of FIG. 1b.
Figure 1B:
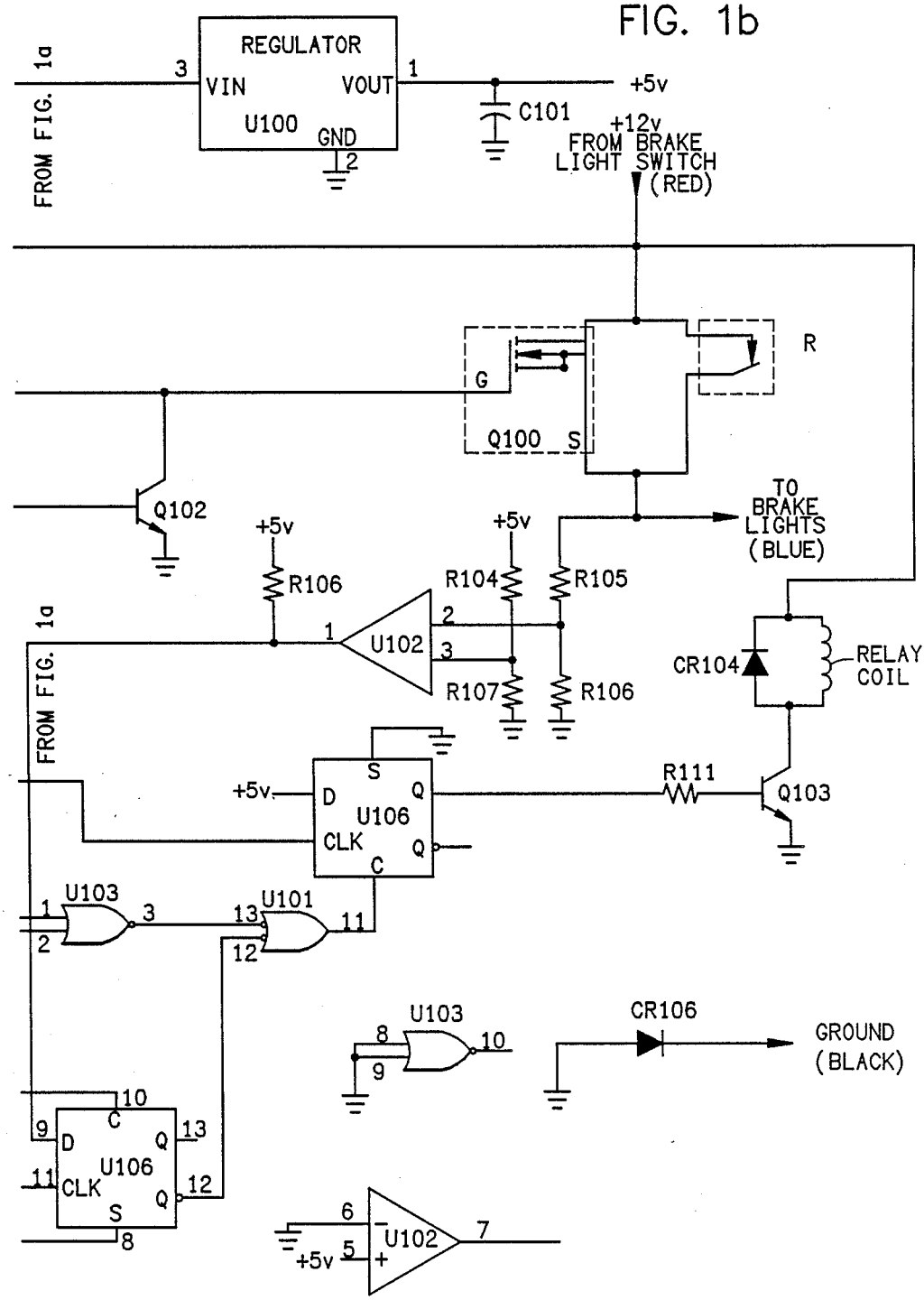

Referring to FIG. 1b, the wire labeled RED is attached to the brake light switch output and provides power to our circuit when the brakes are applied. This necessitates disconnecting the existing wire running from the brake light switch to the brake lights. The wire labeled BLUE is attached to the brake lights via the wire that was disconnected from the switch, above, and provides power to the brake lights subject to the brake light enhancer switching functions. The wire labeled BLACK is attached to a vehicle chassis ground. The preferred embodiment of our brake light enhancer circuit is designed for use only on twelve volt, negative ground vehicles. The wire labeled WHITE (FIG. 1a) is spliced into the output from the turn-signal flasher. There are multiple places that this connection can be made, depending on the particular vehicle involved. However, the purpose of this connection is to sense a low voltage (ground) when the turn-signal flasher flashes the turn-signal lamps.

Our brake light enhancer circuit is comprised of four functional sub-units. These include a voltage regulator and voltage doubler, a relay and driver, a power FET, and a logic circuitry. Each sub-unit is discussed in detail below.

Voltage Regulator and Voltage Doubler

Since automotive power is noisy and its voltage varies over a fairly wide range, our brake light enhancer circuit includes an integrated-circuit voltage regulator U100 (FIG. 1b). When the brake light switch is closed (pedal applied), the automobile's battery voltage (+twelve nominal) is applied via the RED input wire and resistor R100 to the input of the regulator U100. This causes +five volts to appear at U100's output, which supplies the logic circuitry. Capacitors C100 and C101 act to filter noise and switching spikes on the power supply input and output.

In order for an FET Q100 to turn-on fully, a voltage greater than +twelve volts must be applied to its gate terminal. This voltage is derived from a voltage doubler circuit comprising bipolar transistors Q101 and Q102 (FIGS. 1a and 1b); diodes CR100, CR103, CR102, CR101; resistor R101; capacitors C102, and C103; resistor R102 and one quarter of quad AND gate chip U101.

The +twelve volts is also supplied to the drain of the FET Q100 and to one pole of the contacts of relay R. When either the FET or relay is conducting, +twelve volts is outputed via the BLUE wire to the brake lamps.

Relay and Driver

The relay R is an SPST electro-mechanical design which is normally in a closed condition. This relay is connected in parallel with the remainder of the brake light enhancer circuit. When it is closed, the RED and BLUE wires are directly connected, bypassing the FET. Hence, if a signal is not applied to the relay driver in the form of bipolar transistor Q103, our enhancer circuit has no effect and the brake lights will function as if our enhancer circuit had never been installed. The relay contacts are rated to meet or exceed the maximum load of our enhancer circuit. However, due to its design, the relay never actually has to switch with a load applied during normal operation.

Power FET

The brake light flashing function is provided by a power field effect transistor (FET Q100) characterized by very low on-resistance and hence low voltage drop across it when it is switched fully on. To assure that it is fully on, the gate voltage is provided by the voltage doubler described above. During normal operation the gate voltage is being pulsed by transistor Q102 under control of the logic circuitry. Although the FET is being continuously pulsed, the brake lights will only flash when the relay is open.

The relay R is always switched open or closed by the logic circuitry while the FET is turned on and carrying the current to the brake lights. Hence, the relay "shares" current with the FET and doesn't have to switch its full load.

Logic Circuitry

The logic circuitry consists of one counter/oscillator U104, a decimal counter U105, a dual flip-flop U106, a voltage comparator U102, and logic gates U101 and U103. These integrated circuits and related components are connected in such a way as to provide the following functions. When power is first applied to the brake light enhancer circuit, a delayed transition from high-to-low logic levels is implemented using one-quarter of U103, resistors R112 and R113, and capacitor C105. This power-on-reset pulse is present at pin 11 of U103 and is provided to the counters to reset them to initial condition. If the turn signal indicator input wire 16 is high (twelve volts nominal), then diode CR105 blocks current into the brake light enhancer circuit. Resistor R114 and capacitor C106 cause pins 8 and 9 of OR gate U101 to be low when power is first applied to the brake light enhancer circuit, and to then transition high. This causes pin 10 of U101 to go from high to low more quickly than pin 11 of U103 and forces the second flip-flop of U106 into a known state which can then be toggled via the clock input (pin 3 of U106).

If the turn signal indicator input is low, then pin 10 of U101 is held high. This blocks toggling of the flip-flop U106, and hence, the normally-closed relay is never opened and the brake lights stay on continuously. The rest of the sequencing of the logic circuit has no effect.

After the reset pulse, the counters U104, and U105, begin to count up causing i) the relay to open, ii) the FET to turn on and off at a rate of about two Hz, and iii) while the FET is on for the fourth time, the relay R again closes and the brake lights are continuously illuminated. When the brake pedal is released, power is removed from the circuit.

Fail-Safe and Protective Features

In addition to the basic functioning described above, our brake light enhancer circuit has several fail safe features that improve its reliability and safety. The use of a power FET in parallel with a normally closed relay provides several benefits. Heat dissipation is reduced to a minimum. After the initial flashing sequence, lasting less than two seconds, current to the brake lights is carried by the relay. Since the contact resistance is so much less than the on-resistance of even the best semiconductor device, this design produces less heat. In addition, since the FET is now not carrying significant current, its thermal stress is reduced and its life will theoretically be prolonged. The FET Q100 and relay R are independent devices with dissimilar characteristics. Hence, if one should malfunction, the other will continue to work providing at least partial and safe functioning of the brake lights. This characteristic results in four fail-safe operational modes:

MODE (1) If the drive circuit for the relay should fail such that voltage is not applied to the relay coil (including, but not limited to logic circuitry failure), the relay contacts will not open and the brake lights will be continuously illuminated as long as the brakes are applied.

MODE (2) If the FET should fail in an open condition or its drive circuit totally fail, the FET monitor circuit (U102) will cause the relay coil to de-energize and the relay contacts to re-close. This would cause the brake lights to blink once quickly and then come on continuously.

MODE (3) If the relay should fail with its contacts open or its drive circuit in a state where voltage is applied to its coil, the FET will continue to flash the brake lights at approximately two Hz.

MODE (4) If the FET should fail in a shorted condition, the brake lights will be on continuously whenever the brake pedal is applied.

Limitations on relay life come from two sources. The first is contact life, usually due to burning of the contacts from arcing. This is mitigated in our design by opening and closing the relay contacts while the FET is carrying the current load. The second is mechanical life. This is prolonged by using the FET to flash the brake lights. Hence the relay is subjected to only one cycle per brake-pedal application, rather than four cycles. The net effect is greatly enhanced reliability and life expectancy.

Our brake light enhancer circuit is also protected from damage due to mis-connection. Diodes prevent current from entering the circuit via either the WHITE or BLACK wires. If the BLUE and RED wires are reversed, the diode in the FET will conduct and the brake lights will stay on continuously. The only way to damage the circuit is to attempt to drive more brake lights than the circuit is rated for or to short its output completely. Either condition will cause the fuse in the vehicle's brake light circuit to blow before the brake light enhancer circuit is damaged.

The components which are assembled into the circuit of FIGS. 1a and 1b are preferably potted with a thermally conductive epoxy potting compound. This provides two protective characteristics. First, it seals the unit against humidity and dust which would affect relay contact life. Second, it mechanically supports the components, thereby reducing fatigue due to vibration. In addition, the thermally conductive potting allows indefinite operation of the device in failure MODE 3 without heat buildup. Testing confirms that the FET stays below its maximum operating temperature indefinitely with potting. In an air-filled unit, with the same heat-sink area as used in the potted configuration, maximum operating temperature for the FET was exceeded within a few minutes. Without potting, a large external heat sink would be necessary, exposing the FET to possible damage.

Table I set forth below lists suitable electronic components which may be interconnected to provide the circuit of FIGS. 1a and 1b.

TABLE I

| QUANTITY | PART | |
|---|---|---|
| 1 | MC14001BCP | Motorola |
| 1 | MC14011BCP | Motorola |
| 1 | MC14013BCP | Motorola |
| 1 | MC14017BCP | Motorola |
| 1 | MC14060BCP | Motorola |
| 1 | LM2903N | Motorola |
| 1 | MC78L05CP | Volt Reg. Motorola |
| 1 | MTP45N05E | 45 Amp MOSFET Motorola |
| 2 | NPN Transistor | 2N3904 |
| 1 | NPN Transistor | PN2222 |

TABLE I-continued

| QUANTITY | PART | |
|---|---|---|
| 2 | 1 Amp Diode | 1N4001 |
| 4 | Switching Diode | 1N4148 |
| 1 | Zene Diode | 1N5245B |
| 1 | 100 pf disc cap | 50V |
| 1 | 0.01 uf disc cap | |
| 5 | 0.1 uf disc cap | |
| 1 | 100 ohm ¼ W 5% resistor | |
| 1 | 1K ohm ¼ W 5% resistor | |
| 1 | 2.2K ohm ¼ W 5% resistor | |
| 4 | 10K ohm ¼ W 5% resistor | |
| 1 | 22K ¼ W 5% resistor | |
| 2 | 33K ohm ¼ W 5% resistor | |
| 1 | 47K ohm ¼ W 5% resistor | |
| 1 | 75K ohm ¼ W 5% resistor | |
| 2 | 100K ohm ¼ W 5% resistor | |
| 2 | 200K ohm ¼ W 5% resistor | |

Figure 2:
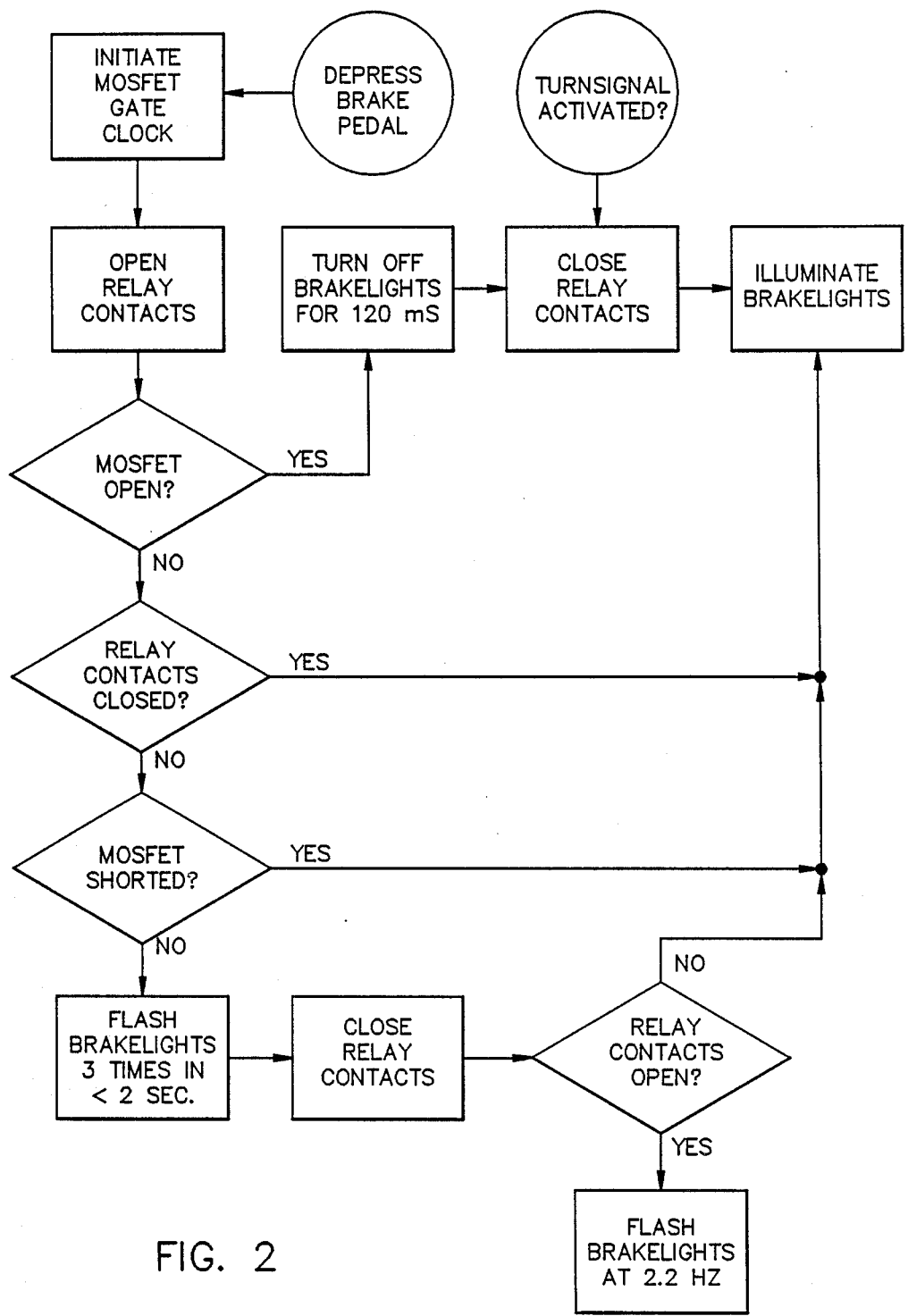
FIG. 2 is a sequential logic diagram illustrating the operation of the circuit of FIGS. 1a and 1b.

FIG. 2 is a sequential logic diagram illustrating the operation of the circuit of FIGS. 1a and 1b. The term MOSFET in this figure refers to the FET Q100 in FIG. 1b.

While we have described a preferred embodiment of our brake light enhancer circuit in detail, it will be understood by those skilled in the art that our invention may be modified in both arrangement and detail. Therefore, the protection afforded our invention should only be limited in accordance with the scope of the following claims.

We claim:

1. In a brake light enhancer circuit for a motor vehicle having left and right rear brake lamps normally continuously illuminated by manual closure of a brake light switch connected between the brake lamps and electric power source, and having left and right rear turn signal lamps which are selectively caused to flash intermittently by connecting thereto a flasher also connected to the electric power source through manual actuation of a turn signal switch from a neutral position, the brake light enhancer circuit being adapted to be connected between the brake light switch, the brake lamps and the turn signal flasher for causing the brake lamps to flash on and off a predetermined number of times when the turn signal switch is in a neutral position upon closure of the brake light switch and for causing the brake lamps to thereafter remain continuously illuminated during the remainder of the time that the brake light switch is closed, the improvement comprising:

an electro-mechanical relay and a solid state switching device connected in parallel to the brake lights so that the brake lamps are flashed on and off by switching of the solid state switching device when the relay is in a predetermined condition.

2. A brake light enchancer circuit for a motor vehicle having a pair of left and right rear brake lamps normally continuously illuminated by manual closure of a brake light switch connected between the brake lamps and electric power source, and having left and right rear turn signal lamps which are selectively caused to flash intermittently by connecting thereto a flasher also connected to the electric power source through manual actuation of a turn signal switch from a neutral position, comprising:

relay means connected between the brake light switch and the brake lamps;

solid state switching means connected between the brake light switch and the brake lamps; and logic circuit means connected between the turn signal flasher, the relay means and the solid state switching means for causing the solid state switching device to turn the brake lamps on and off a predetermined number of times when the relay means is in a predetermined condition and the turn signal switch is in a neutral position upon closure of the brake light switch and for thereafter causing the brake lamps to thereafter remain continuously illuminated during the remainder of the time that the brake light switch is closed, and for permitting normal steady illumination of the brake lamps any time the turn signal switch is moved from its neutral position and the brake light switch is closed.

3. The circuit of claim 2 wherein the solid state switching device comprises a field effect transistor.

4. The circuit of claim 2 and further comprising means connected between the source of power and the solid state switching device for regulating the voltage applied to the solid state switching device.

5. The circuit of claim 2 wherein the logic circuit means includes a counter.

6. The circuit of claim 2 wherein the logic circuit means includes a voltage comparator.

7. The circuit of claim 2 wherein the relay means includes an electro-mechanical relay normally in a closed condition.

8. The circuit of claim 7 wherein the brake lamps are only turned on and off when the rely is in an open condition.

9. The circuit of claim 4 and further comprising means connected between the regulator means and the solid state switching device for increasing a voltage output of the regulator means to a level sufficient to turn the solid state switching device fully on.

* * * * *

UNITED STATES PATENT AND TRADEMARK OFFICE
CERTIFICATE OF CORRECTION

PATENT NO. : 4,956,633

DATED : September 11, 1990

INVENTOR(S) : Waterson et al.

It is certified that error appears in the above-identified patent and that said Letters Patent is hereby corrected as shown below:

On the title page, and in col. 1, lines 1-4, change "BREAK" to --BRAKE--.

Signed and Sealed this

Twenty-second Day of September, 1992

Attest:

DOUGLAS B. COMER

*Attesting Officer*  *Acting Commissioner of Patents and Trademarks*